Aug. 11, 1970 J. H. McKENNA 3,524,076

PULSE AMPLITUDE REGULATOR FOR PRODUCING INCREASING RAMP ON PULSE APPLIED TO INPUT

Filed June 27, 1968

John H. McKenna,
INVENTOR.

BY Harry M. Saragovitz
Edward J. Kelly
Herbert Berl
James T. Deaton

United States Patent Office 3,524,076

Patented Aug. 11, 1970

3,524,076

PULSE AMPLITUDE REGULATOR FOR PRODUCING INCREASING RAMP ON PULSE APPLIED TO INPUT

John H. McKenna, Melville, N.Y., assignor, by mesne assignments, to the United States of America as represented by the Secretary of the Army Filed June 27, 1968, Ser. No. 740,613
Int. Cl. H03k *5/08*
U.S. Cl. 307—237 6 Claims

ABSTRACT OF THE DISCLOSURE

A passive automatic pulse amplitude regulator for producing an increasing ramp pulse at its output when a rectangular pulse is applied at its input. A clipper network in series with a capacitor are positioned across the output such that the rectangular pulse charges the capacitor positively in a ramp function.

BACKGROUND OF THE INVENTION

This invention is in the field of passive pulse shaping circuits, which avoid capacitor droop during the discharge of a bank of capacitors into a radar pulser. A disadvantage of a hard tube type microwave transmitter pulser is the capacitance required to avoid capacitor droop during a pulse. The high vacuum "hard" tube has a high voltage drop during conduction that requires additional energy considerations in its operation. The result is that the capacitance of the main capacitor bank requires a number of bulky and expensive capacitors for proper operations of the hard tube pulser.

SUMMARY OF THE INVENTION

The present invention is a passive automatic pulse amplitude regulator for a hard tube type microwave transmitter pulser. The invention comprises means for producing an increasing ramp pulse at the output of a pulse regulator circuit when a rectangular pulse is applied at its input. Briefly, the pulse regulator is a two terminal input and a two terminal output circuit with one of each pair of terminals interconnected at the same voltage reference level. The other input terminal has a first resistor and a first diode connected in series to one side of a voltage dividing network containing a clipper network connected in series with a capacitor. A second resistor is connected in parallel with the clipper network. A positive bias means is connected to a junction between the clipper network and the capacitor, through a third resistor. The voltage of the biasing means and the resistance of the third resistor is selected so that the capacitor voltage will be at an appropriate minimum value at the start of the next pulse. Prior to a positive pulse at the input, the positive biasing means keeps the first diode reverse biased to cutoff. The clipper network consists of a second diode connected in series with a direct current battery that is reverse biasing the second diode. A second alternative for the clipper network is a Zener diode.

The pulse regulator circuit operates to produce an increasing drive pulse on the grid of a radar switch tube to compensate for main capacitor droop during the pulse. The capacitance required in the main capacitor bank is reduced, resulting in a savings in cost and reduced weight. This operation of the pulse regulator circuit will produce a more constant amplitude output pulse from a hard tube modulator. The pulse regulator circuit works equally well with a pulse or a burst of pulses and will also work to hold the output pulses constant as repetition rate is varied.

An object of the present invention is to provide a more constant output pulse from a hard tube modulator by varying the grid drive of the switch tube that compensates for capacitor discharge droop during radar transmitter pulsing.

Another object of the present invention is to provide a passive circuit for producing a ramp pulse from a rectangular pulse.

Another object of the present invention is to provide a circuit that functions as an analog of the modulator output circuit, automatically computing the charge on the main capacitor bank and accordingly regulating the grid drive of the switch tube.

Other objects will be readily appreciated and the invention may be better understood by reference to the following detailed description when considered in connection with the accompanying drawings.

DETAILED DESCRIPTION OF THE DRAWINGS

Figure 1:
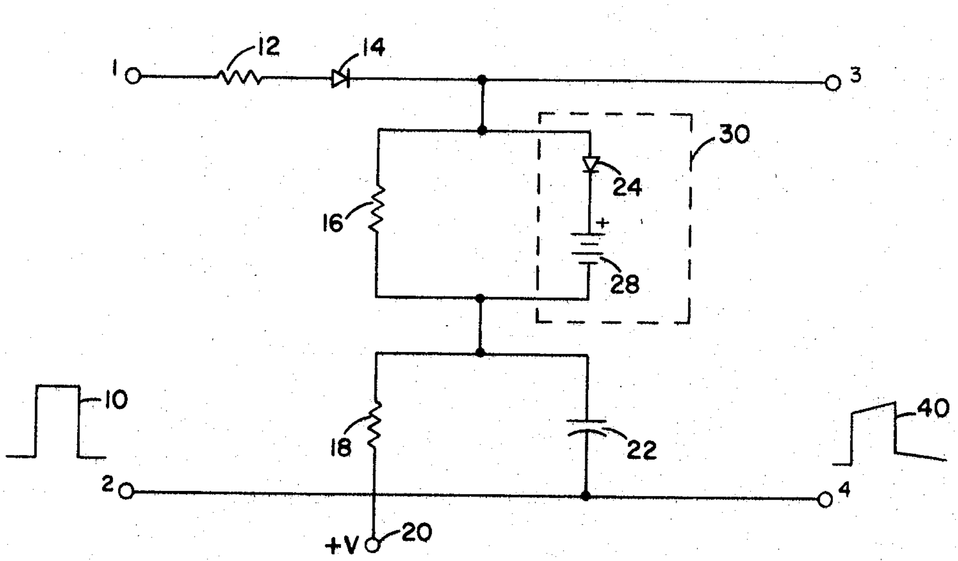
FIG. 1 is a schematic circuit diagram of the preferred embodiment of the pulse regulator in the present invention.

Referring to FIG. 1, a pulse regulator circuit for passing a ramp pulse at its output from a rectangular pulse input is shown comprising two input terminals 1 and 2 and two output terminals 3 and 4. Input terminal 2 and output terminal 4 are connected in common. A first resistor 12 and a first diode 14, that is forward biased when a positive pulse is present at input terminal 1, are serially connected between input terminal 1 and output terminal 3. A clipper network 30 and capacitor 22 are connected across output terminals 3 and 4. A second resistor 16 is connected in parallel with the clipper network 30. The clipper network 30 consists of a second diode 24, that is forward biased, connected in series with a direct current voltage source 28, that reverse biases the second diode 24. A positive bias voltage is applied to terminal 20, that is connected to the junction between capacitor 22 and clipper network 30 through a third resistor 18.

As will be apparent to those skilled in the art, the operation of the pulse regulator circuit, after an input rectangular pulse 10 is applied to input terminals 1 and 2, will cause a ramp voltage output pulse 40 at output terminals 3 and 4. When the input pulse 10 is at its lowest voltage level, a positive bias voltage present at terminal 20, will keep first diode 14 biased to cutoff. When input pulse 10 appears across input terminals 1 and 2, conduction will start through first resistor 12 and first diode 14. Output pulse 40, appearing across output terminals 3 and 4, is amplitude clipped by clipper network 30 at the front portion of the output pulse 40. Output pulse 40 has an increasing ramp top that is the sum of the voltage across clipper network 30 and the increasing positive voltage across capacitor 22 caused by current flowing to it through timing resistor 18, input resistor 12 and clipper network 30. Clipper network 30 consists of clipper diode 24 and direct current voltage source 28. The positive bias voltage, present at terminal 20, controls the minimum value of voltage that output pulse 40 will return to after each pulse.

After input pulse 10 has passed, capacitor 22 recovers toward the bias voltage at terminal 20 at a rate determined by timing resistor 18. Resistor 18 is selected so that capacitor 22 voltage will be at the appropriate minimum value at the start of the next pulse.

Figure 2:
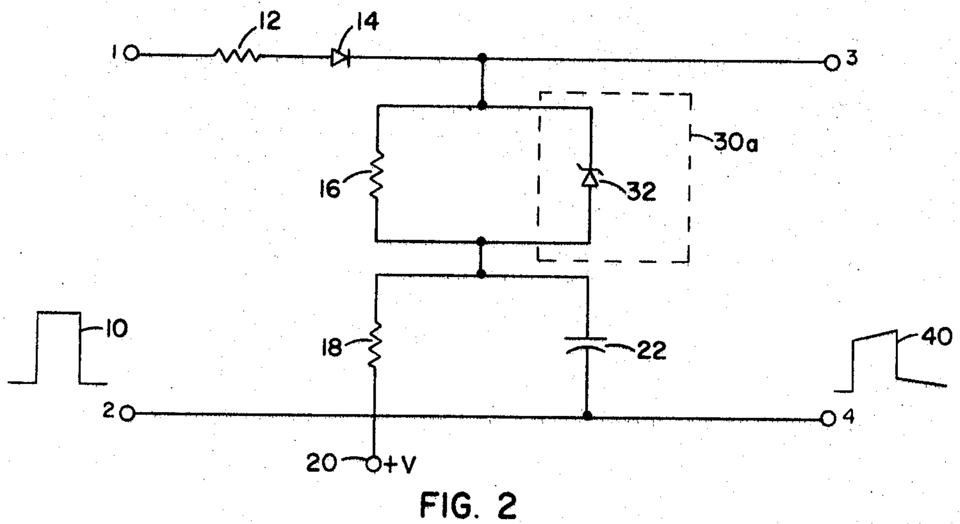
FIG. 2 is an alternate embodiment of the invention.

FIG. 2 illustrates a slight variation of the same pulse regulator circuit of FIG. 1 with clipper diode 24 and direct current voltage source 28 replaced by Zener diode 32 of clipper network **30*a*. When the input pulse 10** reaches a sufficient value to bias Zener diode 32 to its breakdown voltage, output pulse 40 will be clipped with only the additional voltage built up on capacitor 22 being added in an increasing ramp pulse.

While a specific embodiment of the invention has been shown and described, other embodiments may be obvious to one skilled in the art, in light of this disclosure. It is, therefore, to be understood that within the scope of the appended claims the invention may be practiced otherwise than as specifically described.

I claim:

1. A pulse regulator circuit for a direct current electrical pulse having an input circuit and an output circuit; a first resistor; a first diode having first and second terminals, with said input electrical pulse applied to said first terminal of said first diode through said first resistor; a clipper network having first and second terminals; a second resistor having first and second terminals; a capacitor having first and second terminals, with said second terminal of said first diode being connected to a junction of said first terminals of said second resistor and said clipper network, said second terminals of said second resistor and said clipper network being connected to said first terminal of said capacitor, with said first terminal of said clipper network and said second terminal of said capacitor connected across said output circuit so that said capacitor is charged by current flow through said clipper network; a third resistor; and a positive biasing means, said biasing means connected through said third resistor to the junction of said second terminal of said clipper network and said first terminal of said capacitor.

2. A pulse regulator circuit as set forth in claim 1 wherein said clipper network includes a second diode having first and second terminals and a direct current voltage source having first and second terminals, with said first terminal of said second diode being said first terminal of said clipper network, said second terminal of said second diode being connected to said first terminal of said direct current voltage source and said second terminal of said direct current voltage source being said second terminal of said clipper network.

3. A pulse regulator circuit as set forth in claim 2 wherein said first terminal of each of said first and second diodes is an anode and said second terminal of each of said diodes is a cathode.

4. A pulse regulator circuit as set forth in claim 3 wherein said first terminal of said direct current voltage source is a positive voltage source and said second terminal of said direct current voltage source is a negative voltage source.

5. A pulse regulator circuit as set forth in claim 1 wherein said clipper network is a Zener diode having first and second terminals, with said first terminal being said first terminal of said clipper network and said second terminal being said second terminal of said clipper network.

6. A pulse regulator circuit as set forth in claim 3 wherein said first terminal of said Zener diode is a cathode and said second terminal of said Zener diode is an anode.

References Cited

UNITED STATES PATENTS

| | | | |
|---|---|---|---|
| 2,899,553 | 8/1959 | Horton | 307—106 X |
| 3,027,515 | 3/1962 | Clark et al. | 307—268 X |
| 3,196,289 | 7/1965 | Heizer | 307—237 |

JOHN S. HEYMAN, Primary Examiner

S. D. MILLER, Assistant Examiner

U.S. Cl. X.R.

307—106, 268; 328—34, 53, 162; 333—20